United States Patent Office 3,438,918
Patented Apr. 15, 1969

3,438,918
ETHYLENE-PROPYLENE TERPOLYMER RUBBER COMPOSITION WITH IMPROVED TACK
Herbert George Arlt, Jr., Ridgefield, and Charles Oliver Myatt, Stamford, Conn., assignors to American Cyanamid Company, Stamford, Conn., a corporation of Maine
No Drawing. Continuation-in-part of application Ser. No. 316,255, Apr. 20, 1964. This application Dec. 1, 1966, Ser. No. 598,185
Int. Cl. C08f 29/10
U.S. Cl. 260—22           8 Claims

ABSTRACT OF THE DISCLOSURE

Building tack is imparted to ethylene-propylene terpolymer rubber by incorporating therein about 1–20% of a polymeric ester of a polyhydric alcohol with both an organic polycarboxylic acid and either rosin or a drying or semi-drying oil fatty acid mixture such as tall oil fatty acids, preferably as a solution in rubber processing oil.

---

This application is a continuation-in-part of application Ser. No. 361,255 filed Apr. 20, 1964, now abandoned.

The present invention relates to synthetic rubber compositions of improved tack and more particularly to ethylene-propylene synthetic rubber compositions and especially ethylene-propylene-terpolymer compositions of improved tack. Further, the present invention relates to a process for producing such synthetic rubber compositions of improved tack.

"Building tack" is the surface property of natural rubber which enables two pieces of unvulcanized stock to adhere when brought into contact under pressure. This phenomenon is specific between two pieces of natural rubber since such stock will not adhere to other substances such as metal, glass or wood. Bonds of this type ("building tack") are established by diffusion of chain ends and segments into each other. To increase building tack one must therefore add a tackifier which allows the rubber polymer chain ends greater mobility so that they may entangle.

Synthetic rubbers, however, are lacking in this property which is required in many fabricating operations. The building tack of synthetic rubbers, and more particularly ethylene-propylene rubber and ethylene-propylene terpolymer rubber, can be developed nevertheless by the addition of natural rubber or various other agents or tackifiers to the synthetic rubber to impart this property thereto. Electron microscopy applied to tackified and untackified formulations shows that balanced incompatibility accomplished by tackifier addition leads to plasticized nodules which lead to enhanced tack.

Typically in the preparation of rubber goods from ethylene-propylene rubber and ethylene-propylene terpolymer rubber, an agent or tackifier is added to produce tack in the uncured stock so that various piles, possibly of different composition and re-enforcing materials such as cords, can be pressed or plied together. The tackifier holds or sticks the plies together so that the assembly will display sufficient strength to be handled prior to curing.

A tackifier of this type in order to be truly satisfactory in addition to providing tackiness to the various plies before cure should not impair to any significant degree the physical properties of the cured rubber, as for example its tensile strength, modulus or elongation properties. Especially important with EPT-ethylene-propylene terpolymer, the tackifier should not change the excellent aging characteristics since this is the outstanding physical characteristic of EPT-ethylene-propylene terpolymer rubber.

While various resinous compositions are known to be useful as tackifiers with various synthetic rubbers, in order to be effective they necessarily must be employed at such high loadings in the rubber formulations so as to adversely affect the physical properties of the final cured rubber composition or their use results in the impartation of tackiness to a final cured rubber composition. In addition to these disadvantages, high loadings may prove to be costly and to prevent the preparation or formulations for specific end purposes because of the high concentration of such tackifiers in the rubber formulation.

Accordingly, it is an object of the present invention to provide tacky ethylene-propylene uncured rubber compositions, including ethylene-propylene terpolymer rubber stock, in which the tackifier does not significantly adversely affect the physical characteristics of the cured rubber resulting therefrom.

A further object of the present invention is to provide an ethylene-propylene uncured rubber composition, including ethylene-propylene terpolymer rubber stock, characterized in its uncured state by tack through the presence of minor amounts or relatively small loadings of novel tackifiers.

A still further object of the present invention is to provide ethylene-propylene rubber compositions, including ethylene-propylene terpolymer rubber stock, characterized in the uncured state by tack and in the cured state as being essentially tack-free.

A still further object is to provide ethylene-propylene rubber compositions, including ethylene-propylene terpolymer rubber stock, characterized by tack and the presence of a tackifier which does not produce bloom in the cured stock, i.e., the appearance of a light color or surface deposit after cure.

Additionally, these tackifiers do not adversely affect the ozone resistance or aging characteristics of the rubber.

These and other objects and advantages of the present invention will become more apparent from the detailed description thereof set forth hereinbelow.

According to the present invention an uncured tacky ethylene-propylene rubber composition is prepared comprising ethylene-propylene rubber, which term includes ethylene-propylene terpolymer, and as a tackifier for the rubber composition a rubber-compatible polymeric ester.

The ethylene-propylene polymers contemplated for use in the rubber compositions of this invention may be ethylene-propylene rubber, including ethylene-propylene terpolymer rubber, the latter being characterized by the presence of residual unsaturation achieved through the presence of a third monomer component and through the presence of which the terpolymer may be vulcanized. Fundamentally, ethylene-propylene rubbers are materials prepared by polymerization of mixtures of ethylene and propylene or ethylene-propylene in admixture with a small amount of a third monomer of a diene type, with active metal catalysts. U.S. Patents Nos. 2,983,714, 3,081,276, 3,086,964, 3,112,297 and 3,127,379 are typical of the patents describing ethylene-propylene rubber, while U.S. Patents Nos. 2,975,159 and 3,102,876 are typical of patents describing ethylene-propylene terpolymers. Typical ethylene-propylene rubber includes products sold under various designations comprised of ethylene-propylene and a diene monomer such as dicyclopentadiene, divinylbenzene or 1,4 hexadiene. Typical of the EPT ethylene-propylene terpolymers, elastomer types would be an ethylene-propylene-1,4-hexadiene rubber prepared by the methods and catalyst systems described in U.S. Patent No. 2,975,159 and U.S. Patent No. 3,102,876 using the ratio of monomers of 83:14:3. The ratio of the diene termonomer may be varied from 2–5% dependent on the cure system envisioned and the crosslink density required in curing.

The polymeric esters contemplated for use as tackifiers in accordance with the present invention are in general those prepared by reacting polyhydric alcohols and polybasic acids in the presence of or further modified with what may be termed oils (usually a long chain fatty acid) or rosin.

Illustrative of the polyhydric alcohols are ethylene glycol, diethylene glycol, trimethylene glycol, tetramethylene glycol, glycerol, trimethylolpropane, trimethylolethane, sorbitol, pentaerythritol, dipentaerythritol, pinacol, arabitol, xylitol, adonitol, mannitol, or the alkane diols and the like. Such alcohols may be employed singly or in combination with one another. The dibasic or dicarboxylic acids contemplated for use in accordance with the present invention might include such acids as phthalic acid or anhydride, terphthalic acid, 4,4'-(2,2-butylidene)-dibenzoic acid or various of the alpha, beta ethylenically unsaturated dicarboxylic acids such as maleic, fumaric, aconitic, itaconic and the like.

The oil which may be employed to modify some of the polymeric esters includes any of the unsaturated glyceride oils or fatty acids derived therefrom. These oils may thus be semidrying or drying oils and such oils as palm oil, safflower oil, rape seed oil, peanut oil, corn oil, cottonseed oil, linseed oil, perilla oil, castor oil, tall oil, sardine oil, tung oil, whale oil and the like may be employed. Preferably, the oil modifying phase will be various drying fatty acids, particularly drying fatty acids derived from tall oil which are substantially free of rosin and unsaponifiables.

Preferred classes of polymeric esters are those prepared by reacting a polyhydric alcohol such as pentaerythritol, with a polybasic acid such as phthalic acid or anhydride and a drying fatty acid, as for example a fatty acid fraction of high purity derived from tall oil and containing less than 2% of rosin and less than 2% of unsaponifiable materials. A second preferred polymeric ester, employable in accordance with the present invention, is that product prepared by reacting rosin and alpha, beta ethylenically unsaturated acid such as as maleic anhydride and a polyhydric alcohol such as glycerine.

The tackifier is normally employed in an amount of from 1% to 20%, preferably between 1½ and about 15% based on the weight of the ethylene-propylene rubber present in the rubber formulation. Normally such tackifiers have been employed with uniformly good success in amounts of from about 5 to about 10% based on the weight of the ethylene-propylene rubber.

As noted above, the tackifier must be compatible with the ethylene-propylene rubber. By compatible, as that term is employed herein, it is meant that the tackifier be capable of wetting the rubber and other important components of a rubber formulation such as carbon black and exhibit to some extent partial co-solubility in the rubber. The apparent major function of the tackifier is to plasticize chain ends and so increase their mobility, that on pressing together two tackified surfaces for a short time, rubber polymer chain ends may entangle and comingle and create a strong bond at least in numerous scattered sites across the surface. For this, controlled compatibility is required. The relative high polarity of the tackifying resins relative to that of the ethylene-propylenediene elastomer gives them limited compatibility.

As is well known in the rubber formulating art, the rubber compositions may contain various pigments, fillers, antioxidants, carbon black, sulfur and other formulation or curing aids.

The compounding of a solid tackifier with a rubber processing oil produces a material which has a reduced viscosity at elevated temperature. Consequently, the solid tackifier may be more rapidly and completely combined with the ethylene-propylene rubber formulation. Additional benefit is derived by compounding of the tackifiers of this invention in a rubber process oil, since tackifier resin levels may be reduced, the tackifier is incorporated in the rubber formulation more rapidly and approximately the same level of tack achieved. Since rubber process oils are normally used to extend EPT-ethylene-propylene terpolymer rubbers, are inexpensive, and do not significantly effect physical properties at low levels of addition; an economic advantage arises from their use. Since rubber processing oils are normal components of an ethylene-propylene rubber formulation, there is no objection to their use. The choice of a paraffinic, naphthenic, or aromatic processing oil is usually based on compatibility with the rubber formulation, and oxidation and color stability required by the end use of the rubber product. In this case a naphthenic oil intermediate between paraffinic and aromatic oils in solubility and color properties demonstrated the greatest overall utility.

The tackifier may be included in the rubber formulation by mixing in a master batch thereof usually on a rubber mill, again in accordance with procedures well known to those skilled in the art.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

Example 1

A mixture of 148 parts of phthalic anhydride, 115 parts of pentaerythritol and 325 parts of a low rosin content unsaturated fatty acid from tall oil fractionation is charged to a vessel and heated to 240° C. The mixture is held at 240° C. until an acid number of 8 to 10 is reached. This viscous oil polymeric ester is then used as a tackifier in a synthetic rubber formulation to be described more fully hereinafter.

Example 2

A mixture of 1031 parts of tall oil rosin (3% fatty acid and 5% unsaponifiables) and 205 parts of glycerine (99.5%) is prepared and heated to 177° C. in a glass reactor vented to the atmosphere. Maleic acid anhydride, 143 parts, is added in portion over one-half hour. The temperature is then raised to 200–205° C. for one hour and then to 265–270° C. and held until an acid number of 29 is reached. After cooling the glassy solid polyester had a ring and ball softening point of 132° C. This material is compounded with a naphthenic rubber processing oil [1] in a 1:1 weight ratio and this formulation employed as a tackifier in an ethylene-propylene terpolymer synthetic rubber formulation detailed hereinafter.

Example 3

In order to test the materials of Examples 1 and 2 as tackifiers and to compare them with a commercially available phenolic resin tackifier, a master batch of synthetic rubber compound is prepared employing the following:

| | Parts by weight |
|---|---|
| Ethylene-propylene-1,4-hexadiene terpolymer (approximate mole ratio of components (85:20:3) | 100 |
| Zinc oxide | 5 |
| FEF carbon black | 72 |
| Rubber processing oil—a paraffin type oil containing 68% paraffinic, 28% naphthenic, 4% aromatic oils | 40 |
| Sulfur | 1.75 |
| A rubber accelerator—tetramethylthiuram monosulfide | 1.5 |
| A rubber accelerator—2-mercaptobenzothiazole | 0.75 |

The above formulation is mixed as a master batch on a rubber mill at 90° F. and portions are then compounded with the tackifiers of Examples 1 and 2 and a commercially

---

[1] This process oil had an SUS viscosity at 100° F. of 2079, a flash point of 445° F., an aniline point of 174° F. and an average molecular weight of 400. 20% of the carbon atoms were aromatic, 39% naphthenic and 41% aliphatic.

available phenolic resin tackifier at levels of 5 to 10 parts per hundred (PHR) based on the weight of the ethylene-propylene terpolymer used. The results of these tests are set forth in Table I blow.

TABLE I.—UNCURED RUBBER COMPOUND

| Tackifier | Tackifier, phr.[1] | Initial | Initial 48 hrs.[2], lbs. | 72 hrs.[2], lbs. | 96 hrs.[2] delayed, lbs. |
|---|---|---|---|---|---|
| Example 1 | 5 | Good | 7 | 10+ | 5.5 |
|  | 10 | do | 10+ | 10+ | 6 |
| Example 2 | 5 | do | 5 | 10+ | 5.5 |
|  | 10 | do | 10+ | 10+ | 5.5 |
| Commercial | 5 | Fair | 6 | 8 | 2 |
| Phenolic resin | 10 | do | 4 | 4 | 6 |
| No tackifier |  | Poor | 5.5 | 5.5 | 2.5 |

[1] Phr.= parts per hundred parts rubber.
[2] The values under 48, 72 and 96 hours are pounds pull required to separate plies 1″ × 1″ × 6″.

Table I demonstrates that the tackifiers of this invention are superior to a commercially available tackifier at lower concentrations, and that superiority at all concentrations tested is more pronounced when the time period of the test is extended. Thus the tackifiers of this invention have a definite practical commercial advantage.

Example 4

The formulations containing 10 PHR of tackifier described and evaluated in the uncured state in Example 3 above were cured for 30 minutes at 307° F. and various physical properties evaluated. These cured formulations were then aged and re-evaluated. The results of these evaluations appear in Tables II and III hereinbelow.

Tables II and III demonstrate that the tackifiers of the instant invention do not seriously adversely affect important physical properties or characteristics of ethylene-propylene terpolymer rubber which has been cured and aged on an accelerated basis.

TABLE II

|  | Min. cured at 307° F. | Control, "no tackifier" | Ex. 1 | Ex. 2 | Commercial phenolic rosin tackifier |
|---|---|---|---|---|---|
| Tensile, p.s.i.[1] | 30 | 2,390 | 2,050 | 2,390 | 2,210 |
| Modulus 100%[2] | 30 | 220 | 170 | 230 | 170 |
| Modulus 300%[2] | 30 | 1,250 | 840 | 1,180 | 980 |
| Elongation percent[3] | 30 | 510 | 590 | 590 | 570 |
| Hardness[4] | 30 | 52 | 54 | 54 | 52 |

For footnotes see Table III.

TABLE III.—PERCENT CHANGE DUE TO OVEN AGING 5 DAYS AT 250° F. CURED 30 MIN. AT 307° F.

|  | No tackifier | Example 1 | Example 2 | Phenolic rosin tackifier |
|---|---|---|---|---|
| Tensile[1] | −18.2 | +2.5 | −23.5 | −14 |
| Modulus 300%[2] | +56.8 | +132.2 | +51.6 | +88 |
| Elongation Percent[3] | −21.6 | −25.5 | −30.5 | −28 |

[1] Tensile strength is defined as the force per unit of the original cross-sectional area which is applied at the time of rupture of the dumbbell test specimen. It is calculated by dividing the breaking force in pounds by the cross-section of the unstressed specimen in square inches.
[2] Modulus—Modulus or stress, is used to express the amount of pull in pounds per square inch required to stretch the test specimen to a given elongation. It expresses resistance to extension, or stiffness in the vulcanizate.
[3] Elongation—The term elongation is used to describe the ability of the rubber to stretch without breaking. To describe this property as measured, it is more accurate to refer to it as "ultimate elongation," since its value, expressed as percent of the original length, is taken at the moment of rupture.
[4] Hardness—This property as applied to rubber implies resistance to indentation. Hardness is expressed as a number referring to the scale of the instrument by which it is measured. It is an important property, frequently used in rubber specifications along with the tensile properties to which it is somewhat related. ASTM designations D314-52T, D531-49 and D676-55T describe hardness testing methods by the most commonly used methods.

Example 5

A mixture of 400 parts of tall oil fatty acids (less than 5% rosin and less than 2% unsaponifiables), 560 parts of tall oil rosin (3% fatty acid and 5% unsaponifiables) and 110 parts of technical pentaerythritol were mixed in a glass-lined reaction vessel and were heated to 275° C. over 2 hours. The temperature was then held at about 275° C. for about 7 hours. The product obtained was a viscous liquid with an acid number of 24 and a density of 7.5 pounds per gallon.

This material, when tested as tackifier at 5–15 PHR, gave tack which was satisfactory for construction of uncured rubber assemblies.

Example 6

A mixture of 730 parts of tall oil fatty acid (1.2% rosin and 1.2% unsaponifiables), 334 parts of phthalic anhydride, 236 parts of technical pentaerythritol, 35 parts of ethylene glycol and 70 parts of xylene were combined in a glass reactor equipped with a water azeotrope trap. The mixture was heated to 200° C. during which time a substantial amount of water azeotrope was separated. The heating was continued until about 240° C. was reached. This temperature was maintained for 5¾ hours. During the last half hour the xylene was substantially removed by distillation. The product was a viscous liquid (Gardner viscosity $Z_2/Z_3$ as a 70% solution in Varsol 1 with an acid number of 7.3).

This material was tested as a tackifier at 5 and 10 PHR loading and was found to be similar to the material described in Example 1.

Example 7

A mixture of 714 parts of low rosin (less than 4%) tall oil fatty acid, 444 parts of phthalic anhydride, 282 parts of technical pentaerythritol, and 39 parts of ethylene glycol was prepared in a resin reactor vented to the atmosphere and was heated with stirring to 240° C. over about 2 hours. The reaction temperature was held for 4 hours. The viscous polyester obtained had an acid number of 10.

When tested at 5–10 PHR loading in an ethylene-propylene rubber formulation, this material is a satisfactory tackifier.

Example 8

A mixture of 250 parts of tall oil rosin was combined with 30.5 parts of technical pentaerythritol and was heated to 305° C. in 2 hours with stirring. This temperature was held for an additional 4½ hours with stirring. This temperature was held for an additional 4½ hours so that a glassy polyester product (neat tackifier resin) with an acid number of 27 was obtained.

The resin, 100 parts, was combined with 100 parts of a naphthenic type rubber processing oil at about 150° so that a homogeneous solution was obtained. On cooling to room temperature, a hard waxy solid resulted.

This tackifier resin solution and the neat tackifier resin was examined as a tackifier and was found to be roughly equivalent to the material of Example 2.

Example 9

A mixture of tall oil rosin, 258 parts, glycerine, 58 parts, and fumaric acid, 42.3 parts, was prepared in a reactor vented to the atmosphere. The mixture was heated with stirring to 200° over 2 hours. The temperature was then raised slowly to 280° over an additional 2 hours. A glassy product with an acid number of 43 was obtained (neat resin).

Compounding with the rubber processing oil described in Example 2 on a 1:1 weight basis (tackifier resin solution), and testing in an ethylene-propylene 1,4-hexadiene terpolymer, this formulation demonstrates that this ester has tackifying properties similar to Example 2 materials.

The following table compares the neat resin to the resin solution in the napthenic oil:

TABLE

| Tackifier | Tackifier, phr.[1] | Tack[2] | | | | |
|---|---|---|---|---|---|---|
| | | Initial | 48 hrs., lbs. | 72 hrs., lbs. | 24 hrs., lbs. | 96 hrs., lbs. |
| Control | 0 | Fair | 1 | 0 | 1 | 0 |
| Neat tackifier resin | 5 | Excellent | 10+ | 10+ | 3.5 | 2.0 |
| Neat tackifier resin | 10 | ...do... | 10+ | 10+ | 5.0 | 7.0 |
| Tackifier resin solution | 5 | ...do... | 10+ | 10+ | 3.5 | 5.0 |
| Tackifier resin solution | 10 | ...do... | 10+ | 10+ | 4.0 | 10+ |

[1] Phr.=parts per hundred parts rubber.
[2] The values under 48, 72 and 96 hours are pounds pull required to separate plies 1" × 1" × 6".

Examples 10–12

Samples of wood, gum and formaldehyde modified rosin were converted to polyesters by the following procedure.

The rosin, 1030 parts, and glycerine, 205 parts, were combined and heated to 177° C. Maleic acid anhydride, 143 parts, was then added in portions with continued heating and stirring. The temperature was increased to 205°. After holding one hour, the temperature was raised to 270° C. until a product with an acid number of 25–35 was obtained. The products were characterized as described in the following table:

| Rosin | Wood rosin | Gum rosin | 3% formaldehyde[1] modified tall oil rosin |
|---|---|---|---|
| Softening point ring and ball, °C | 136 | 148 | 147 |
| Gardner viscosity as 65% toluene solution | V | Z₁+ | Z₃ |
| Gardner 1933 color as 65% toluene solution | 9 | 12+ | 12+ |
| Acid number | 34 | 30 | 26 |

[1] Described in U.S.P. 2,934,468.

These rosin esters were compounded at elevated temperatures with the rubber processing oil employed in Example 2 at the 50% solids level and hard waxy products were obtained on cooling. These had tackifying properties similar to Example 2 and 8 materials.

Example 13

A sample of 250 parts of disproportionated rosin and 25.6 parts of glycerine (99.5%) were combined and heated to 270° C. over three hours with stirring. The reaction temperature was then maintained at 270–280° C. until an ester with an acid number of 30 was produced.

This ester was compounded at elevated temperature with the rubber processing oil employed in Example 2 in a 1:1 weight ratio. Compounding into an ethylene-propylene terpolymer rubber formulation at 5 and 10 PHR, it developed sufficient tack to construct uncured plied mechanical goods.

Example 14

A mixture of 453 parts of tall oil fatty acid (less than 5% rosin), 102 parts of technical grade pentaerythritol, 194 parts of trimethylolethane, 296 parts of phthalic anhydride and 65 parts of xylene was prepared. This was heated with stirring to 240° C. over 1 hour in a reactor equipped with an azeotrope trap and condenser. A substantial amount of water was collected. The reaction mixture was then held at 235–245° C. for an additional three hours. A semi-solid polyester with an acid number of 8 was obtained. This material was tested as previous examples and proved to be a satisfactory tackifier.

We claim:

1. An uncured ethylene-propylene terpolymer rubber composition comprising ethylene-propylene terpolymer rubber and as a tackifier from about 1% to about 20% by weight of the terpolymer rubber of a polymeric ester, said ester being selected from the group consisting of polymeric esters prepared by reacting poly-basic acids and drying or semi-drying fatty acids with polyhydric alcohol to a low acid number and polymeric esters prepared by reacting rosin and alpha, beta ethylenically unsaturated diabasic acids with polyhydric alcohol to a low acid number.

2. An uncured ethylene-propylene terpolymer rubber composition according to claim 1 comprising ethylene-propylene terpolymer rubber having dispersed uniformly therein from about 1% to about 20% based on the weight of the rubber, of a polymeric ester tackifier, said ester being the product obtained by reacting tall oil rosin and a member of the group consisting of maleic anhydride, maleic acid and fumaric acid with glycerine to a low acid number.

3. A composition according to claim 2 wherein the amount of polymeric ester tackifier is from about 5% to about 10% of the weight of the rubber.

4. An uncured ethylene-propylene terpolymer rubber composition according to claim 1 comprising ethylene-propylene terpolymer rubber having dispersed uniformly therein from about 1% to about 20%, based on the weight of the rubber, of a polymeric ester tackifier, said ester being the product obtained by reacting tall oil fatty acid and phthalic anhydride with polyhydric alcohol to a low acid number.

5. A composition according to claim 4 wherein the amount of polymeric ester tackifier is from about 5% to about 10% of the weight of the rubber.

6. A process for producing tack in uncured ethylene-propylene terpolymer rubber comprising mixing therewith, in tackifying amounts, a polymeric ester selected from the group consisting of polymeric esters prepared by reacting polybasic acids and drying or semi-drying fatty acids with polyhydric alcohol to a low acid number, and polymeric esters prepared by reacting rosin and alpha, beta ethylenically unsaturated dibasic acids with polyhydric alcohol to a low acid number, said ester being employed as a solution in rubber processing oil.

7. A method of producing tack in an uncured ethylene-propylene terpolymer rubber in accordance with claim 6 which comprises dissolving in a napthenic rubber processing oil a polymeric ester obtained by reacting rosin and a member of the group consisting of maleic anhydride, maleic acid and fumaric acid with glycerine to a low acid number and compounding with an uncured ethylene-propylene terpolymer a quantity of the resulting solution sufficient to incorporate therein tackifying amounts of said polymeric ester within the range of about 1% to 20% based on the weight of the rubber.

8. A process according to claim 7 wherein the amount of polymeric ester incorporated into the rubber is within the range of from about 5% to about 10%.

References Cited

UNITED STATES PATENTS

| | | | |
|---|---|---|---|
| 2,664,378 | 12/1953 | Heller | 154—139 |
| 2,983,714 | 5/1961 | Robinson et al. | 260—79.5 |
| 3,106,550 | 10/1963 | Bitting et al. | 260—97.5 |
| 3,324,229 | 6/1967 | Ingmanson | 260—23.7 |

OTHER REFERENCES

Compounding Ingredients for Rubber; 2nd edition, 1947, p. 267 relied upon, copy in Scientific Library, TS 1890 I53.

Whitby: Synthetic Rubber, 1954, p. 383 relied upon, copy in Scientific Library, TS 1925 W45.

Materials and Compounding Ingredients for Rubber and Plastics, 1965 p. 802 relied upon, copy in Scientific Library TS 1890 I53.

DONALD E. CZAJA, Primary Examiner.

R. W. GRIFFIN, Assistant Examiner.

U.S. Cl. X.R.

260—23.7, 26, 27, 33.6, 41.5

UNITED STATES PATENT OFFICE
CERTIFICATE OF CORRECTION

Patent No. 3,438,918    Dated April 15, 1969

Inventor(s) Herbert George Arlt, Jr., et al.

It is certified that error appears in the above-identified patent and that said Letters Patent are hereby corrected as shown below:

In the heading to the printed specification, lines 5 to 7, "assignors to American Cyanamid Company, Stamford, Conn., a corporation of Maine" should read -- assignors, by mesne assignments to Arizona Chemical Company, New York, N. Y., a corporation of Deleware --.

Signed and sealed this 15th day of June 1971.

(SEAL)
Attest:

EDWARD M.FLETCHER,JR.
Attesting Officer

WILLIAM E. SCHUYLER, JR.
Commissioner of Patents